United States Patent
Shilo

(10) Patent No.: US 10,846,330 B2
(45) Date of Patent: Nov. 24, 2020

(54) SYSTEM AND METHODS FOR VOCAL COMMENTING ON SELECTED WEB PAGES

(71) Applicant: HEYOYA SYSTEMS LTD., Herzlia (IL)

(72) Inventor: Nir Shilo, Herzlia (IL)

(73) Assignee: Heyoya Systems Ltd., Herzlia (IL)

( * ) Notice: Subject to any disclaimer, the term of this patent is extended or adjusted under 35 U.S.C. 154(b) by 425 days.

(21) Appl. No.: 15/108,212

(22) PCT Filed: Dec. 23, 2014

(86) PCT No.: PCT/IL2014/051123
§ 371 (c)(1),
(2) Date: Jun. 24, 2016

(87) PCT Pub. No.: WO2015/097702
PCT Pub. Date: Jul. 2, 2015

(65) Prior Publication Data
US 2016/0321272 A1  Nov. 3, 2016

Related U.S. Application Data

(60) Provisional application No. 61/920,751, filed on Dec. 25, 2013.

(51) Int. Cl.
*G06F 16/60* (2019.01)
*G06F 16/958* (2019.01)
(Continued)

(52) U.S. Cl.
CPC .......... *G06F 16/60* (2019.01); *G06F 16/686* (2019.01); *G06F 16/958* (2019.01);
(Continued)

(58) Field of Classification Search
CPC .................................................. G06F 17/3074
See application file for complete search history.

(56) References Cited

U.S. PATENT DOCUMENTS 6,026,148 A    2/2000  Dworkin et al.
7,792,257 B1 * 9/2010  Vanier ................. H04M 3/4878
                                                           379/114.13
(Continued)

FOREIGN PATENT DOCUMENTS

CN         101667188 A      3/2010

OTHER PUBLICATIONS

International Search Report and Written Opinion for International Patent Application No. PCT/IL2014/051123 dated Mar. 16, 2015.

*Primary Examiner* — Richard L Bowen
(74) *Attorney, Agent, or Firm* — Troutman Pepper Hamilton Sanders LLP; James E. Schultz; Lauren N. Giambalvo

(57) ABSTRACT

Vocal commenting system and methods for recording and playing a voice message associated with a selected internet page. The system includes a voice-commenting-management module, operatively activated on a personal device of a user, the personal device having a microphone, and a vocal-commenting-services server. The server includes a processing unit, a database unit including a comments database. The vocal commenting methods include the step of posting a voice comment, using the microphone. Upon completion of the voice comment, the voice-commenting-management module sends the voice comment to the server. The vocal commenting method further includes the steps of receiving the recorded voice comment by the server, storing the recorded voice comment in a remote storage services proving unit, analyzing the recorded voice comment thereby generating metadata associated with the recorded voice comment, and storing the metadata of the comment in a comments database.

7 Claims, 6 Drawing Sheets

(51) Int. Cl.
  *G06F 16/9535* (2019.01)
  *G06F 16/68* (2019.01)
  *G06Q 30/02* (2012.01)
  *G10L 15/26* (2006.01)

(52) U.S. Cl.
  CPC ..... *G06F 16/9535* (2019.01); *G06Q 30/0277* (2013.01); *G10L 15/26* (2013.01)

(56) References Cited

U.S. PATENT DOCUMENTS

| | | | |
|---|---|---|---|
| 7,818,324 B1* | 10/2010 | Held | G06F 17/30386 707/741 |
| 8,165,997 B1 | 4/2012 | Podgorny et al. | |
| 8,862,593 B1* | 10/2014 | Zureiqat | G11B 27/329 704/276 |
| 2006/0184800 A1* | 8/2006 | Rosenberg | G07C 9/37 713/186 |
| 2006/0282328 A1* | 12/2006 | Gerace | G06F 17/30867 705/14.66 |
| 2008/0074493 A1* | 3/2008 | Laughlin | H04N 21/235 348/143 |
| 2009/0043814 A1 | 2/2009 | Faris et al. | |
| 2011/0055282 A1 | 3/2011 | Hoving | |
| 2011/0112835 A1* | 5/2011 | Shinnishi | G06F 17/2755 704/235 |
| 2011/0264653 A1* | 10/2011 | Cierniak | G06F 17/3089 707/723 |
| 2012/0102091 A1 | 4/2012 | Rao | |
| 2012/0253492 A1* | 10/2012 | Andrews | H04W 4/021 700/94 |
| 2012/0304206 A1* | 11/2012 | Roberts | H04H 60/33 725/12 |
| 2013/0198108 A1* | 8/2013 | Walia | G06Q 40/06 705/36 R |
| 2013/0275857 A1 | 10/2013 | Norwood et al. | |
| 2014/0046660 A1* | 2/2014 | Kamdar | G10L 25/63 704/235 |
| 2014/0067395 A1* | 3/2014 | Balasubramanian | G06Q 30/0241 704/251 |
| 2014/0128039 A1* | 5/2014 | Maybach | H04M 3/53333 455/413 |

* cited by examiner

SYSTEM AND METHODS FOR VOCAL COMMENTING ON SELECTED WEB PAGES

CROSS REFERENCE TO RELATED APPLICATIONS

This application is a U.S. National Stage of International Patent Application No. PCT/IL2014/051123, filed 23 Dec. 2014, which claims priority to U.S. Provisional Patent Application No. 61/920,751, filed 25 Dec. 2013, both which are fully incorporated by reference.

FIELD OF THE INVENTION

The present invention generally relates to the field of websites commenting and more particularly, to a system and methods that facilitate vocal web pages commenting.

BACKGROUND OF THE INVENTION

Many popular websites, such as news, sites have a staff of writers and editors that generate original content on a daily basis. These websites report a write articles on vast variety of subject matters. A myriad of people read these websites and many of those readers have strong opinions about the articles they read and other related subject matter.

To engage readers more thoroughly, and keep them from navigating away from the website, many sites implement a commenting system whereby a reader may leave a written comment that is displayed under the story they are commenting on. Other readers may comment in response to previous comments, or they may start their own commenting thread.

While such commenting systems may be empowering to readers, it often results in comments that are not interesting or of low quality, inappropriate or off-subject, or do not add to the content of the story in any intelligent way. Often, such commenters hide behind a false identity, which is difficult to verify.

There is therefore a need and it would be advantageous to have a commenting system and methods that is more convenient to use and more trustworthy.

SUMMARY OF THE INVENTION

The principle intentions of the present invention include providing a system and methods that facilitate vocal web pages commenting, wherein the system includes a remote server for managing the comments, and wherein the comments can be coupled to any web page. The system and methods facilitate a user to post a new voice comment, to be associated with an internet page of interest he/she has selected, or play a voice comment associated with a selected web page, previously recorded by anyone.

According to the teachings of the present invention, there is provided a vocal commenting system for recording and playing a voice message associated with a selected internet page. The system includes a voice-commenting-management module, operatively activated on a personal device of a user, the personal device having a microphone, and a vocal-commenting-services server. The vocal-commenting-services server includes a processing unit, a database unit including a comments database and a remote storage services proving unit.

The processing unit may be a grid computing workflow management system and/or a server main-processing-unit.

The vocal commenting system may further include an advertising platform.

An aspect of the present invention is to provide vocal commenting method for recording a voice message associated with a selected internet page. The vocal commenting method includes the step of posting a voice comment, using a microphone of a personal device having an activated voice-commenting-management module. Upon completion of the voice comment, the voice-commenting-management module sends the newly recorded voice comment to a vocal-commenting-services server.

The vocal commenting method further includes the steps of receiving the newly recorded voice comment by vocal-commenting-services server, storing the newly recorded voice comment in a remote storage services proving unit, analyzing the newly recorded voice comment thereby generating metadata associated with the newly recorded voice comment, and storing the metadata of the comment in a comments database.

The posting of a voice comment may include the steps of activating the voice-commenting-management module, wherein the voice-commenting-management module activates the microphone of the personal device, terminating voice recording by deactivating the microphone, and sending the newly recorded voice comment to the vocal commenting server.

Optionally, the microphone is activated for a preconfigured time interval.

Optionally, the microphone is deactivated after a preconfigured silent time interval.

Optionally, the user enters textual data associated with the newly recorded voice comment. The textual data includes mandatory data and/or non-mandatory data.

Optionally, the user flags a selected comment, and wherein the voice-commenting-management module sends the flag to the vocal-commenting-services server that records the flag with association to the selected voice comment.

An aspect of the present invention is to provide vocal commenting method for playing a voice message associated with a selected internet page. The vocal commenting method including the steps of selecting a recorded voice comment associated with a selected internet page and playing the selected recorded voice comment.

The vocal commenting method may further include the step of recording a new voice message associated the played voice comment.

The vocal commenting method may further include the step of indexing the voice comments stored in the comments database, thereby facilitating fast fetching by a target search engine.

The indexing process is a cyclic process that is automatically activated every N minutes. The indexing process may include the steps of selecting next the voice comment, analyzing the voice comment to identify all data segments contained within the selected voice comment, structuring an indexed record of the selected voice comment, using the identified data segments, saving the indexed record in a respective indexed file in a remote storage services proving unit, and repeating these steps for all voice comments in the comments database.

Optionally, the vocal commenting methods may further include an advertising procedure. The advertising procedure may include the steps of sending an ad request, upon entering a URL address that facilitates recording of voice comments, fetching user related data, extracting ad categories and ad keywords, fetching the most suitable ads that comply with the categories and keywords, sending the fetched ads to the user, and playing the ads on the personal device. The user related data may include pages visited by the user and voice and/or textual comments posted or accessed by the user.

BRIEF DESCRIPTION OF THE DRAWINGS

The present invention will become fully understood from the detailed description given herein below and the accompanying drawings, which are given by way of illustration and example only and thus not limitative of the present invention, and wherein.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. It is understood that the phraseology and terminology employed herein is not to be construed as limiting and are for descriptive purpose only.

Methods of the present invention may be implemented by performing or completing manually, automatically, or a combination thereof, selected steps or tasks. The order of performing some methods step may vary. The descriptions, examples, methods and materials presented in the claims and the specification are not to be construed as limiting but rather as illustrative only.

Meanings of technical and scientific terms used herein are to be commonly understood, unless otherwise defined. The present invention can be implemented for testing or practice with methods and materials equivalent or similar to those described herein.

Figure 1:
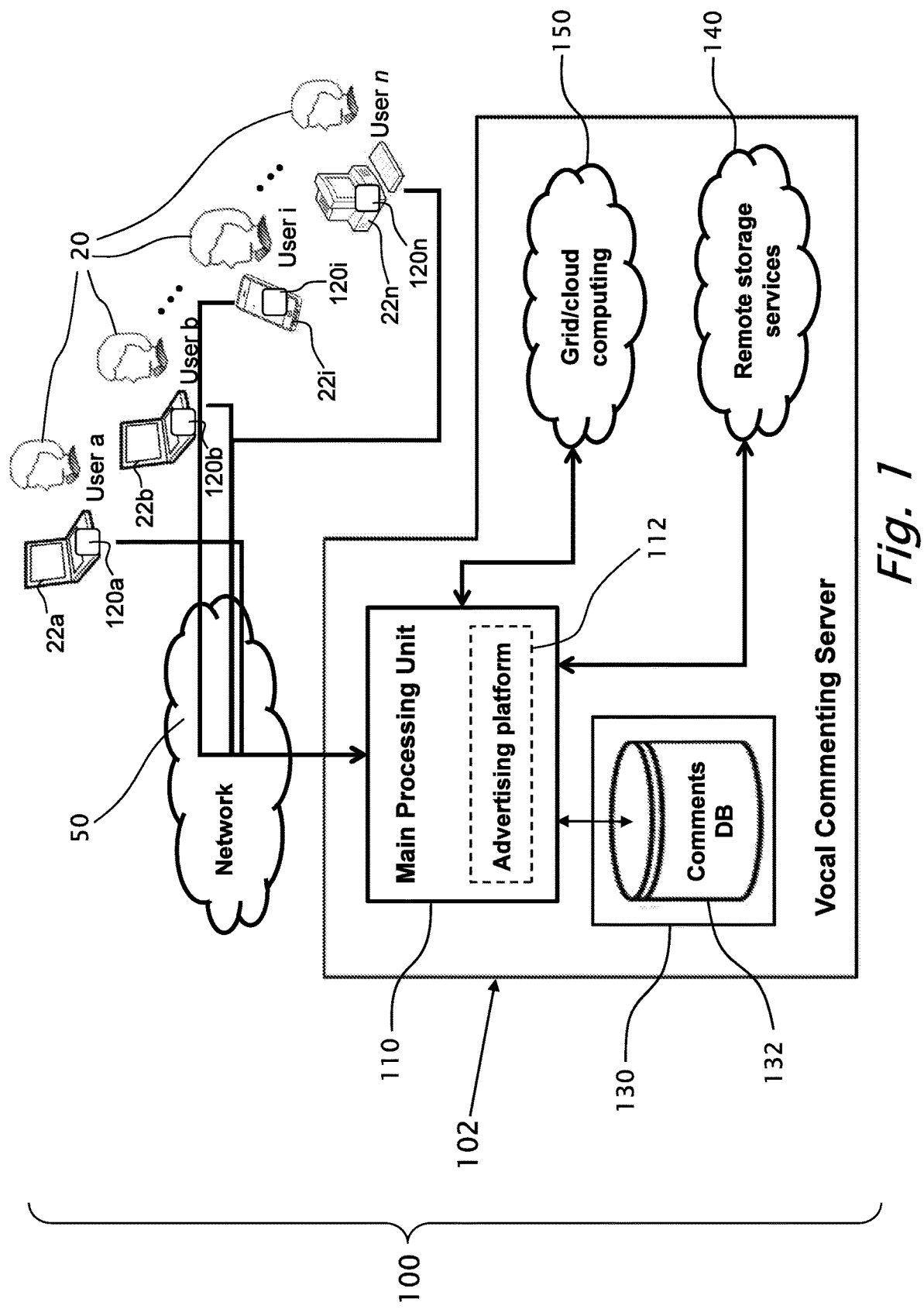
FIG. 1 is a general schematic block diagram illustration of the components of a vocal commenting system, according to an embodiment of the present invention.

Reference is now made to the drawings. FIG. 1 is a general schematic block diagram illustration of the components of a vocal commenting system 100, according to an embodiment of the present invention. Vocal commenting system 100 includes a server that can be a server 102 of a provider of vocal commenting services. Server 102 includes a processing unit, wherein the processing unit of server 102 may be a grid computing workflow management system 150 and/or a main-processing-unit 110. The present invention will be described, by way of example, with no limitations, in terms of the processing unit being main-processing-unit 110.

Vocal-commenting-services server 102 further includes a database unit 130 and a main-processing-unit 110 and a storage system such as remote storage services proving unit 140. Database unit 130 includes a comments-DB 132 and possibly other databases such as a users' DB.

It should be noted that the present invention will now refer to storage system as being remote storage services proving unit 140, but the present invention is not limited in using remote storage services such as cloud services, and may use local storage devices and or services, or a combination of local storage devices and or services and remote storage services.

Vocal commenting system 100 may be used by users 20, each coupled with a personal device 22, being in a communication flow with an internet network 50 and having a voice-commenting-management module 120, activated thereon. Personal mobile device 22 is in communication flow with vocal-commenting-services server 102 over a wireless network 50, including an internet network.

To use vocal commenting system 100, a user $20_i$ surfs the internet over network 50, and selects a site and a page of interest. User $20_i$ uses any device that facilitates connection to the internet, such as a desktop computer, a laptop computer, a tablet or a smart mobile device, having a dedicated voice-commenting-management module $120_i$ running thereon, in the background. If user $20_i$ desires to post a comment to be associated with the selects page of interest and activates voice-commenting-management module $120_i$.

Figure 2:
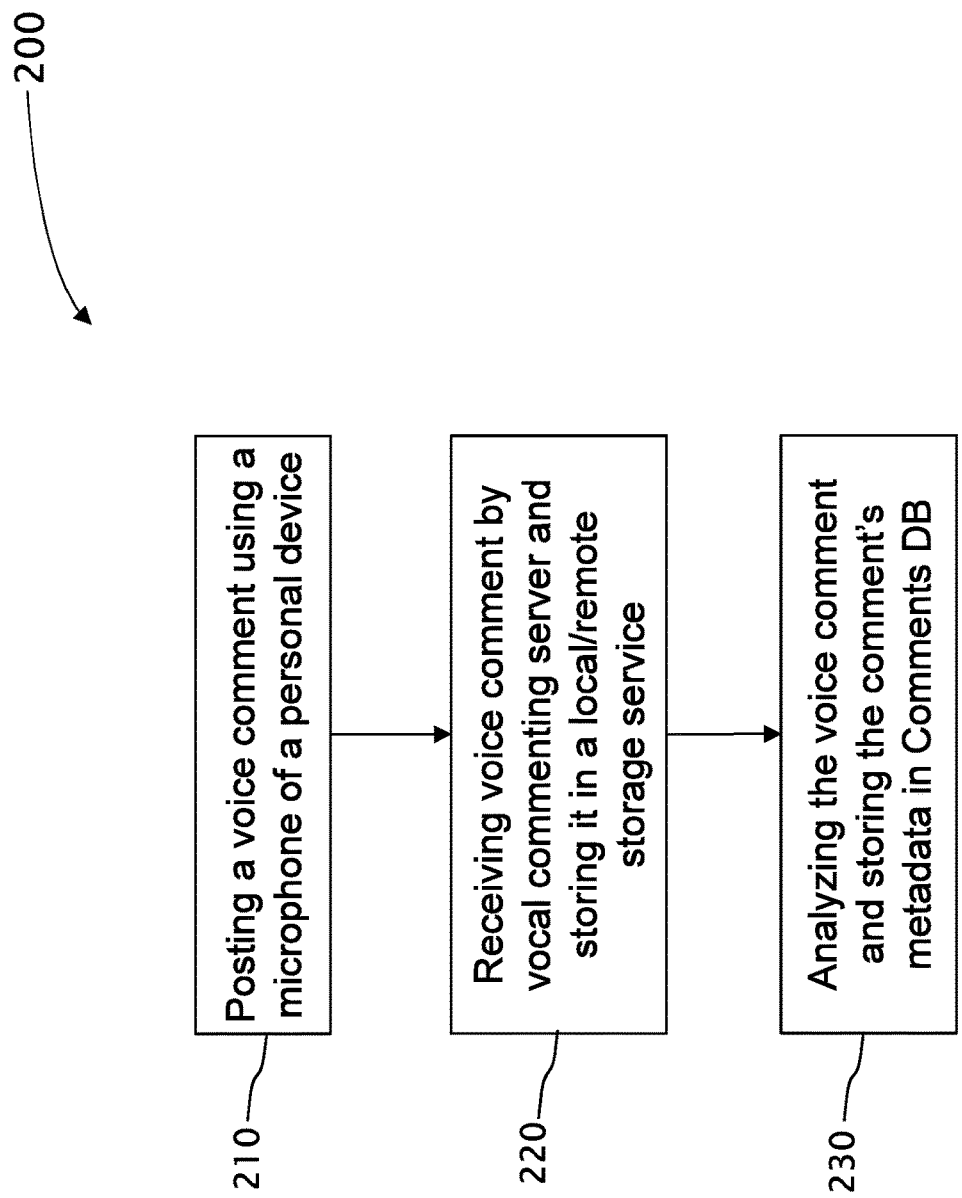
FIG. 2 shows a schematic flowchart diagram of a method of posting a voice comment, according to an embodiment of the present invention.

Reference is now made to FIG. 2, showing a schematic flowchart diagram of an example vocal-commenting-posting method 200 for serving a user $20_i$ that desires to post a new voice comment to be associated with an internet page of interest he/she has selected, according to embodiments of the present invention. Once user $20_i$ has activated dedicated voice-commenting-management module $120_i$, vocal-commenting-posting method 200 proceeds as follows:

Step 210: posting a voice comment using a microphone of a personal device.

By activating voice-commenting-management module $120_i$, user $20_i$ indicates to that he desires to either post a new voice comment or to hear a recorded voice comment.

Figure 3:
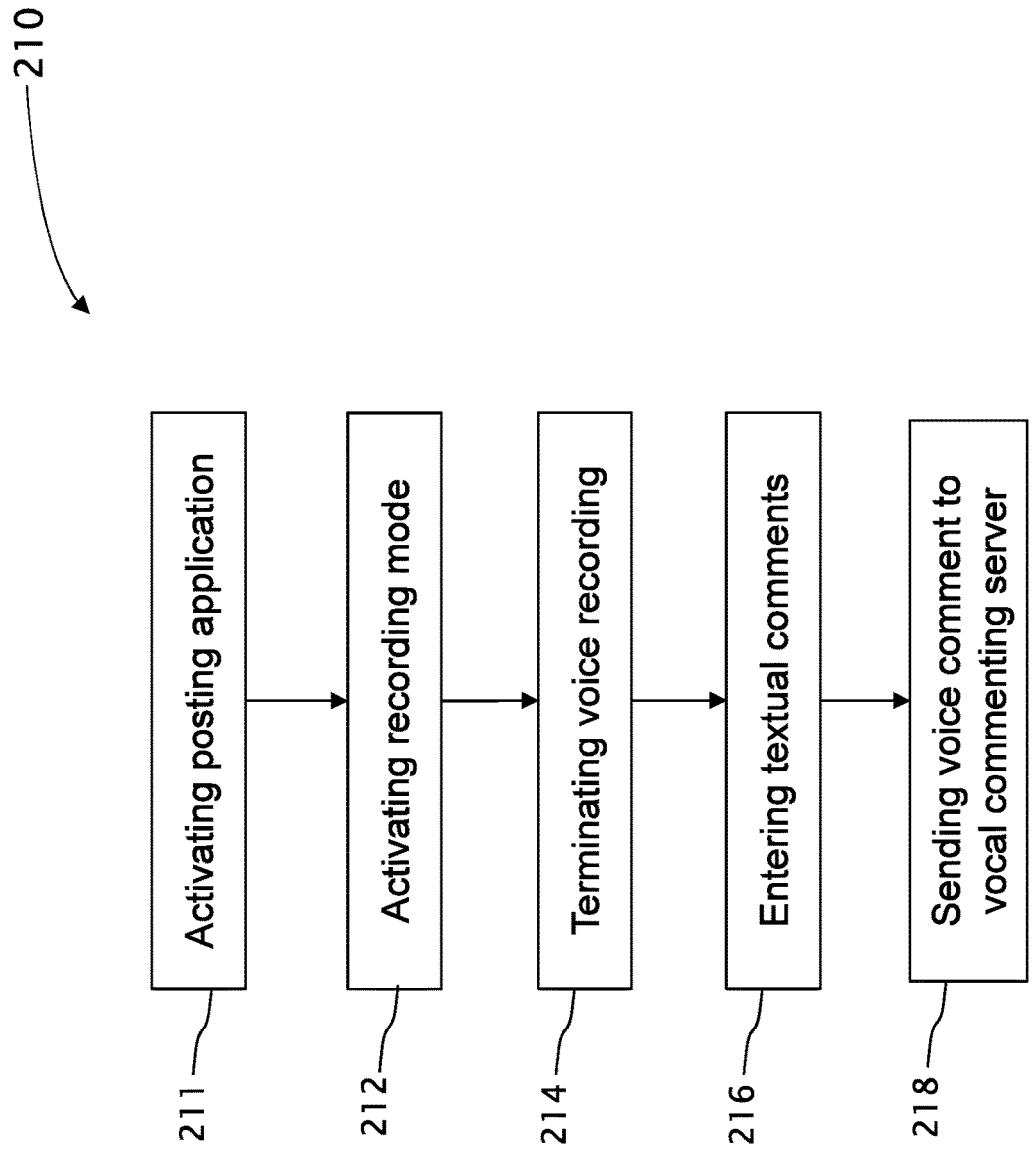
FIG. 3 shows a schematic flowchart diagram of an example recording method being part of the method of posting a voice comment, outlined in FIG. 2.

To post a new voice comment to be associated with an internet page of interest he/she has selected, the method proceeds with the following steps, as outlined in FIG. 3:

Step 211: activating a posting application in order to post a voice comment using a microphone of a personal device.

User $20_i$ activates voice-commenting-management module $120_i$ in order to post a voice comment. Voice-commenting-management module $120_i$ activates the microphone of personal device $22_i$.

Step 212: activating recording mode.

Voice-commenting-management module $120_i$ activates the microphone of personal device $22_i$. User $20_i$ records his/her message, typically, within a limited time interval.

Step 214: terminating voice recording.

Voice-commenting-management module $120_i$ deactivates the microphone of personal device $22_i$, either after a preconfigured time interval, or after silent time interval, or after user $20_i$ has indicated to do so.

Step 216: entering textual comments.

User $20_i$ enters textual data. The textual data may include mandatory data and/or non-mandatory data.

Step 218: sending voice comment to vocal commenting server.

User $20_i$ indicates to voice-commenting-management module $120_i$ that the new voice comment is completed. Voice-commenting-management module $120_i$ sends the newly recorded voice comment, including the textual data, to vocal-commenting-services server 102.

Step 220: receiving the newly recorded voice comment by vocal commenting server.

Main processing unit 110 receives the newly recorded voice from voice-commenting-management module $120_i$ and store the voice comment in remote storage services proving unit 140.

Step 230: analyzing the newly recorded voice comment.

Main processing unit 110 analyzing the newly recorded voice comment and storing the metadata of the comment in Comments DB 132.

(end of vocal-commenting-posting method 200)

Preferably, to facilitate fast fetching of a stored voice comment to enable fast play upon a request of a user $20_i$, each of the voice comments stored in comments DB 132 are indexed by main processing unit 110 and stored in remote storage services proving unit 140. Preferably, the indexed file is stored in a preconfigured format that is supported by a target search engine such as Google, Bing, Yahoo and the like.

Figure 4:
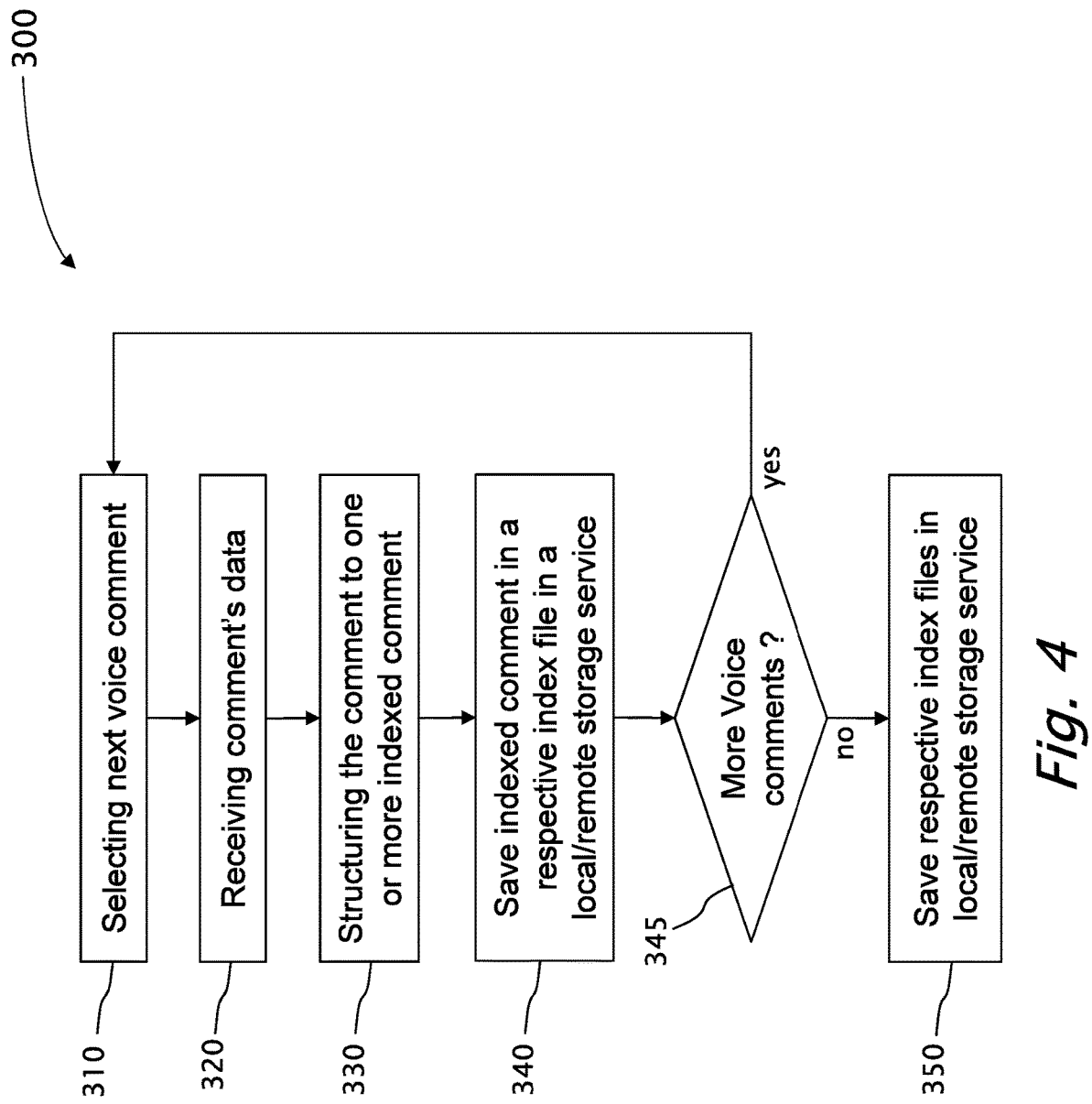
FIG. 4 shows a schematic flowchart diagram of a cyclic method for indexing the voice comments stored in the comments database, according to an embodiment of the present invention.

Typically, the indexing process is a cyclic process that is automatically activated every N minutes. Reference is now also made to FIG. 4, showing a schematic flowchart diagram of a cyclic method 300 for indexing the voice comments stored in comments DB 132, according to an embodiment of the present invention. Method 300 proceeds as flows:

Step 310: selecting next voice comment.

Main processing unit 110 selects the next voice comment from comments DB 132.

Step 320: receiving comment's data.

Main processing unit 110 fetches the selected next voice comment, and analyzes the voice comment to identify all data segments contained within the fetched voice comment.

Step 330: structuring the voice comment to one or more indexed comment.

Main processing unit 110 builds the indexed record of the voice comment, using the identified data segments.

Step 340: save the indexed record of the voice comment in the remote storage services.

Main processing unit 110 saves the indexed record of the voice comment in a respective indexed file in remote storage services proving unit 140.

Step 345: check if there are more voice comments in the comments DB.

Main processing unit 110 checks if there are more voice comments in comments DB 132.

If there are more voice comments in comments DB 132, go to step 310.

Step 350: save respective index files with the remote storage services.

Since there are no more voice comments in comments DB 132, save respective index files, formed/updated in the indexing process, with in remote storage services proving unit 140.

(end of indexing method 300)

Figure 5:
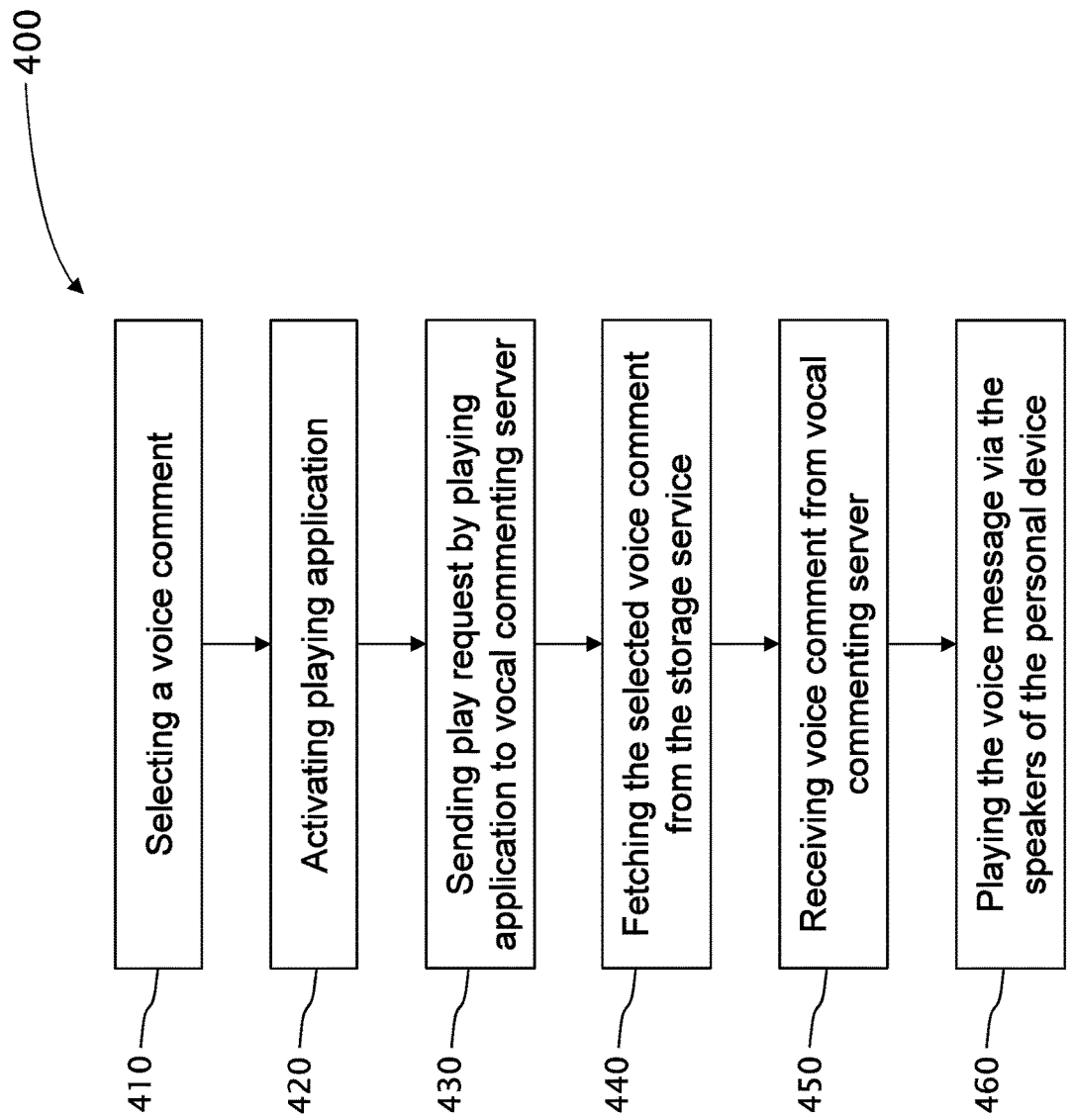
FIG. 5 shows a schematic flowchart diagram of a method playing a recorded voice comment.

Reference is now made to FIG. 5, showing a schematic flowchart diagram of a method 400 of playing a recorded voice comment. Method 400 proceeds as flows:

Step 410: selecting a voice comment.

User $20_i$ selects a voice comment in a selected internet page of a selected internet site.

Step 420: activating playing application in order to play a selected voice comment using a speaker of a personal device.

User $20_i$ activates voice-commenting-management module $120_i$ in order to play a selected voice comment in a selected internet page. Voice-commenting-management module $120_i$ activates the one or more speakers of personal device $22_i$.

Step 430: sending the play request by voice-commenting-management module $120_i$ to vocal commenting server.

Voice-commenting-management module $120_i$ sends the play request to vocal-commenting-services server 102.

Step 440: fetching the selected voice comment from the storage service.

Main processing unit 110 fetches the requested voice message as stored in the respective indexed file in remote storage services proving unit 140.

Step 450: receiving the fetched voice comment from vocal commenting server.

Voice-commenting-management module $120_i$ receives the fetched voice comment from vocal-commenting-services server 102.

Step 460: playing the voice message via the speakers of the personal device.

Voice-commenting-management module $120_i$ plays the received voice comment to user $20_i$, though the activated one or more speakers of personal device $22_i$.

(end of vocal comment playing method 400)

In variations of the present invention, there is provided a method of flagging a selected voice comment by the user. A user $20_i$ flags the selected comment and voice-commenting-management module $120_i$ send the flag to vocal-commenting-services server 102, which records the flag with association to the selected voice comment.

In variations of the present invention, there is provided a method of capturing a user activity, initiated by voice-commenting-management module $120_i$. The collected activity data is sent by voice-commenting-management module $120_i$ to vocal-commenting-services server 102, which records the statistical data. It should be noted that the collected activity data me be collected by any analytic tools, including tools provided by a third party.

In variations of the present invention, vocal commenting system 100 may also collect information from one or more voice comments posted by the same user or read by the same user. The information collected may also include data extracted from a voice recording comment, the title of the comment, the commenter name, the content of the textual message associated with the voice comment and the user ID. Information may also be collected from the system, such as the creation date, the assigned category of the comment (sport, art, politics etc.), country, language, content title keywords, gender, mood (i.e., laugh, yell etc.), recommended voice filters, personal voice recognition, voice match between people and voice patterns analysis (i.e., mood recognition).

In variations of the present invention, vocal commenting system 100 may also include an advertising platform 112 that generates ads derived from data related to posted voice comments. Advertising platform 112 may be integrated with main processing unit 110, or embodied as an ads service or as a separated server coupled to operate with main processing unit 110.

Figure 6:
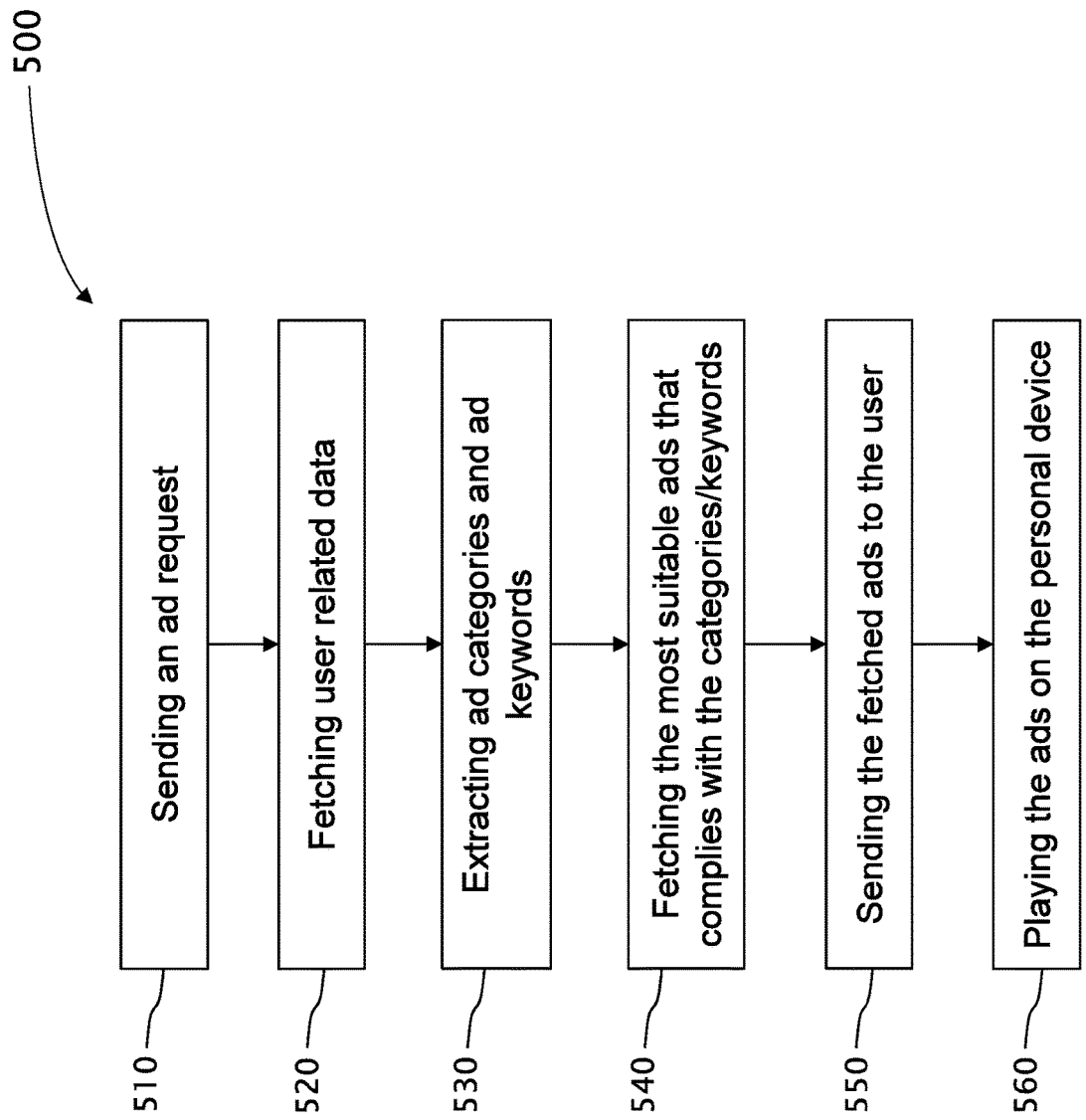
FIG. 6 shows a schematic flowchart diagram of a method of presenting ads to a user of a URL address that facilitates recording of voice comments.

Reference is now made to FIG. 6, showing a schematic flowchart diagram of a method 500 of presenting ads to a user of a URL address that facilitates recording of voice comments. Method 500 proceeds as flows:

Step 510: sending an ad request.

Upon entering a URL address that facilitates recording of voice comments, by user $20_i$, voice-commenting-management module $120_i$ sends and ad request to vocal commenting system 100.

Step 520: fetching user related data.

Advertising platform 112 fetches characteristics data associated with user $20_i$, from database unit 130. For example, pages visited by user $20_i$, voice and/or textual comment data, etc.

Step 530: extracting ad categories and ad keywords.

Advertising platform 112 extracts ad categories and ad keywords from the fetched characteristics data associated with user $20_i$.

Step 540: fetching the most suitable ads that complies with the categories/keywords.

Advertising platform 112 fetches the most suitable ads that comply with the extracted categories and keywords.

Step 550: sending the fetched ads to the user.

Vocal-commenting-services server 102 sends the fetched ads to personal device $22_i$ of user $20_i$.

Step 560: playing the ads on the personal device.

Voice-commenting-management module $120_i$ plays one or more of the received ads on personal device $22_i$ of user $20_i$.

(end of vocal comment playing method 500)

Although the present invention has been described with reference to the preferred embodiment and examples thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the following claims.

What is claimed is:

1. A vocal commenting method for recording voice messages associated with selected internet pages using a microphone of a personal device having an activated voice-commenting-management module, the method comprising the steps of:
   a) posting a voice comment via the microphone, wherein the voice comment is stored and processed by voice-commenting-management module, wherein posting the voice comment comprises the steps of:
       activating said voice-commenting-management module, wherein said voice-commenting-management module activates the microphone of said personal device;
       terminating voice recording by deactivating said microphone; and
       sending said voice comment to said vocal commenting server;
   b) storing said voice comment in a remote storage services proving unit;
   c) analyzing said voice comment thereby generating metadata associated with said voice comment, the metadata including user related data including voice recognition data capable of identifying gender or mood of a user;
   d) storing said metadata of the voice comment in a comments database;
   e) voice recognition and classification indexing of voice comments stored in said comments database, thereby facilitating fast fetching by a target search engine;
   (f) determining advertisement categories and advertisement keywords based on the user related data; and
   (g) determining an advertisement based on the advertisement categories and advertisement keywords,
   wherein the user flags a selected comment, and wherein said voice-commenting-management module sends the flag to said vocal-commenting-services server that records the flag with association to said selected voice comment,
   wherein recordings of voice comments embedded in the selected internet pages are part of the web page, and
   wherein the recording is done on the site but operatively activated on the personal device of the user.

2. The vocal commenting method of claim 1, wherein said microphone is activated for a preconfigured time interval.

3. The vocal commenting method of claim 1, wherein said microphone is deactivated after a preconfigured silent time interval.

4. The vocal commenting method of claim 1, wherein the user enters textual data associated with said voice comment.

5. The vocal commenting method of claim 4, wherein said textual data includes mandatory data, non mandatory data, or combinations thereof.

6. The vocal commenting method of claim 1, wherein said classification indexing is a cyclic process that is automatically activated every N minutes, said classification indexing comprising the steps of:
   a) selecting next said voice comments;
   b) analyzing said voice comments to identify all data segments contained within said selected voice comments;
   c) structuring an indexed record of said selected voice comments, based on the identified data segments;
   d) saving said indexed record in a respective indexed file in a remote storage services proving unit; and
   e) repeating steps a)-d) for all voice comments in said comments database.

7. The vocal commenting method according to claim 1, wherein user related data further comprises pages visited by the user and voice and/or textual comments posted or accessed by the user.

* * * * *